(12) United States Patent
Orr et al.

(10) Patent No.: US 6,353,230 B1
(45) Date of Patent: Mar. 5, 2002

(54) MONITORING MATERIALS (75) Inventors: Christopher Henry Orr; Craig Janson Luff; Thomas Dockray, all of Calderbridge (GB); Duncan Whittemore Macarthur, Los Alamos, NM (US)

(73) Assignees: British Nuclear Fuels PLC, Cheshire (GB); The Regents of the University of California, Oakland, CA (US)

( * ) Notice: Subject to any disclaimer, the term of this patent is extended or adjusted under 35 U.S.C. 154(b) by 0 days.

(21) Appl. No.: 09/307,221

(22) Filed: May 7, 1999

(30) Foreign Application Priority Data

May 8, 1998 (GB) ................................................ 9809740

(51) Int. Cl.$^7$ ................................................ G01T 1/18
(52) U.S. Cl. ........................................ 250/394; 250/376
(58) Field of Search ................................. 250/394, 376

(56) References Cited

U.S. PATENT DOCUMENTS

| | | | |
|---|---|---|---|
| 4,267,446 A | * 5/1981 | Brown et al. | 250/394 |
| 4,788,430 A | * 11/1988 | Gonthier | 250/376 |
| 4,814,608 A | 3/1989 | Dempsey et al. | 250/253 |
| 4,853,536 A | 8/1989 | Dempsey et al. | 250/253 |
| 4,992,658 A | 2/1991 | Ramsey et al. | 250/253 |
| 5,008,540 A | 4/1991 | Dempsey | 250/336.1 |
| 5,055,674 A | 10/1991 | Kotrappa | 250/255 |
| 5,059,803 A | 10/1991 | Kronenberg | 250/385.1 |
| 5,107,108 A | 4/1992 | Ramsey et al. | 250/253 |
| 5,126,567 A | 6/1992 | Dempsey et al. | 250/336.1 |
| 5,128,540 A | 7/1992 | Stieff | 250/255 |
| 5,184,019 A | 2/1993 | MacArthur et al. | 250/380 |
| 5,187,370 A | 2/1993 | MacArthur et al. | 250/379 |
| 5,194,737 A | 3/1993 | MacArthur et al. | 250/382 |
| 5,281,824 A | 1/1994 | MacArthur et al. | 250/380 |
| 5,311,025 A | 5/1994 | MacArthur et al. | 250/374 |
| 5,514,872 A | 5/1996 | Bolton et al. | 250/380 |
| 5,525,804 A | 6/1996 | MacArthur et al. | 250/374 |
| 5,550,381 A | 8/1996 | Bolton et al. | 250/380 |
| 5,663,567 A | 9/1997 | Steadman et al. | 250/382 |
| 5,679,958 A | 10/1997 | MacArthur | 250/382 |
| 5,877,502 A | 3/1999 | Koster et al. | 250/382 |

FOREIGN PATENT DOCUMENTS

WO  WO 98/38531  9/1998  ................ 1/185

* cited by examiner

*Primary Examiner*—Constantine Hannaher
*Assistant Examiner*—Andrew Israel
(74) *Attorney, Agent, or Firm*—Workman, Nydegger & Seeley (57) ABSTRACT

The apparatus and method provide techniques for effectively implementing alpha and/or beta and/or gamma monitoring of items or locations as desired. Indirect alpha monitoring by detecting ions generated by alpha emissions, in conjunction with beta and/or gamma monitoring is provided. The invention additionally provides for screening of items prior to alpha monitoring using beta and/or gamma monitoring, so as to ensure that the alpha monitoring apparatus is not contaminated by proceeding direct to alpha monitoring of a heavily contaminated item or location.

The invention provides additional versatility in the emission forms which can be monitored, whilst maintaining accuracy and avoiding inadvertent contamination.

18 Claims, 2 Drawing Sheets

MONITORING MATERIALS

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of CRADA No. LA96C10298 and Contract No. W-7405-ENG-36 awarded by the U.S. Department of Energy.

BACKGROUND OF THE INVENTION

1. Field of the Invention

This invention concerns improvements in and relating to analysis and screening, particularly but not exclusively, to the analysis and screening of materials from radioactive environments, such as those materials destined for decommissioing.

2. Present State of the Art

Any item or material which spends time within an active area of a nuclear facility may become contaminated by radioactive material from within that area. As a result of this, before the item can be removed and reused or recycled or disposed of, its level of contamination needs to be evaluated. Evaluation of the level of contamination is particularly significant as the higher category of waste the item is categorised as the greater the subsequent storage/disposal costs will be.

Specific detection. systems have been employed in the past to evaluate gamma sources present on or in conjunction within an item, with subsequent separate evaluation of beta sources through an additional piece of apparatus and with a still further piece of apparatus needed to evaluate the alpha contamination. Evaluation of the alpha contamination is particularly problematical as alpha particles can only be detected directly a very short distance from the source.

BRIEF SUMMARY AND OBJECTS OF THE INVENTION

The present invention aims to provide a system and method of operation for analysis which is flexible in terms of the types of radiation source which can be investigated and evaluated.

The level of contamination an item possesses may vary considerably between individual items even where they have been exposed to substantially the same environment. As a consequence of this, there is minimal point in conducting detailed alpha and beta evaluation of an item if the gamma contamination subsequently proves to be substantial. To avoid this unnecessary time penalty and consequent cost, the present invention introduces a screening method whereby alpha contamination is only evaluated once gamma and/or beta contamination has been established to be below a certain threshold. This has Additional advantages in that the sensitive alpha detecting apparatus is not unduly contaminated by premature exposure of the system to an item very heavily contaminated with sources of radiation.

According to a first aspect of the invention we provide an instrument for monitoring one or more of alpha, beta and gamma emitting sources on an item or location, the instrument being provided with alpha and/or beta and/or gamma monitoring means for the item or location.

Preferably the item or location is in contact with a medium, alpha emissions generating ions in the medium. The instrument preferably has a detecting chamber, the detecting chamber being provided with one or more electrodes for discharging ions. The instrument is preferably further provided with means to monitor ions discharged and/or collected on the electrode (s). Preferably the instrument is provided with means for moving the medium from in proximity to with the item to the one or more electrodes.

The item(s) may be or include tools, pipes, pumps, filters, cables, beams, rods and the like. The locations may include surfaces in general, such as floors, walls, ceilings, soil, rubble, material on a conveyor, or parts thereof, as well as including parts of, or surfaces of, items, such as glove boxes, tanks, vessels and the like.

Preferably the item is mounted or supported so as to maximise the surface area exposed, for instance to the airflow.

The item or location may be introduced within the detecting chamber.

The medium may be a fluid, such as a liquid, but is normally a gas. The gas may be a mixture, such as air, or may be in substantially single gas form, such as argon.

The detecting chamber may comprise an elongate chamber. The detecting chamber may have a circular or rectilinear cross-section. Preferably the chamber is electrically conducting.

The detecting chamber may be provided with an inlet and an outlet, the electrodes being provided between the inlet and the outlet. The inlet and/or outlet may connect to the surrounding environment for the instrument, for instance to give an open circuit instrument.

Preferably means are provided within the instrument to remove extraneous ions and/or particulate matter in the medium. The ions and/or particles may be removed by a filter.

A filter may be provided downstream of the electrodes, preferably before the outlet. A filter is preferably provided in this way in a sealed system (a system in which the medium is re-circulated) and/or to remove particulate material.

Particularly in an open system, the filter may be provided between the inlet from the surrounding environment and the item or location. A filter may also be provided between the detecting chamber and the outlet to the surrounding environment.

The detecting chamber may be openable to introduce or remove an item or location.

Preferably the item or location is positioned upstream in the medium flow relative to the electrodes, where medium flow is used to move the ions.

The instrument may be provided with a single electrode. The instrument may be provided with a charge element or disc, such as an electret.

Preferably the apparatus comprises a plurality of electrodes, the electrodes being spaced from one another. The electrodes may be configured with a first outer electrode and a second outer electrode and none or one or more intermediate electrodes provided there between.

The electrodes are preferably arranged parallel to the direction of medium flow, such is airflow. Preferably the medium flow passes through the spacing between the electrodes.

One or more, and preferably all, of the electrodes may be planar. Preferably the electrodes are provided parallel to one another. Preferably the electrodes are provided in opposition, for instance, an outer electrode being opposed by one electrode, an intermediate electrode being opposed by two electrodes. the spacing between the electrodes is preferably the same between each pair of opposing electrodes. The spacing between the outer electrodes and the detector chamber is preferably the same as between opposing electrodes.

The electrodes may be continuous, such as a plate, or discontinuous, such as a grid.

An applied, preferably externally generated, potential may be employed. The electrical potential is preferably provided by an external power source. An electrostatic potential may be employed, for instance from a charged element, such as an electret.

Potentials of between 5 V and 3000 V, for instance between 10 V and 1000 V, may be provided.

The means for monitoring ions discharged on the electrode(s) may comprise electrostatic charge monitoring means. More preferably the means for monitoring ions discharged or collected on the electrode(s) comprise current indicating means and more preferably current measuring means. Preferably a single current measuring means is used. Preferably the combined current of all the electrodes connected to the current measuring means in measured. An electrometer, such as a ground referenced electrometer or floating electrometer may be used for this purpose.

The means for moving the medium may be a fan. Preferably the electrodes are provided between the medium moving means and the item or location. The fan may be of controllable, and preferably of variable, speed.

Preferably the medium moving means, such as the fan, can be inhibited so as to avoid medium flow. Preferably the medium flow means are inhibited in response to control signals. Preferably the control signals to the medium flow means are a function of the gamma and/or beta emission levels monitored. The medium flow means may be inhibited by stopping power supply to the fan and/or by presenting a physical barrier between the item or location and the medium flow means, most preferably between the item or location and the electrodes.

One or more discrete flow paths over a surface or surfaces of the item or a location may be provided. A pipe, for instance, may have an external flow path separated from an internal flow path by the material forming the pipe. Preferably means are provided for regulating the medium flow along one or more of the discrete paths. Detection of alpha sources on or in one more of the discrete paths alone may be provided by obscuring or inhibiting one or more of the other flow paths. Sealing means may be provided to inhibit flow along one or more of the flow paths, most preferably in a selective manner. Inflatable seals and/or iris seals and/or aperture seals may be provided.

The beta emissions may be inferred form on the measured alpha emissions and/or measured gamma emissions by means of calculation.

The beta emissions may be monitored directly by providing one or more beta detectors in association with the instrument. The beta detector(s) may be mounted within the detector chamber, preferably in proximity to the item or location. It is preferred that the beta detector(s) only be separated from the item or location by the fluid.

The beta detectors may comprise thin plastic scintillators connected to a photo tube or gas flow proportional counters.

The gamma emissions may be monitored directly by providing one or more gamma detectors in association with the instrument. The gamma detectors may be mounted in, on or outside the detector chamber. The gamma detectors may be part of and/or attached to and/or moveable relative to the detector chamber. A separate gamma detecting chamber may be provided.

The gamma detectors may comprise thick plastic scintillators or sodium iodide crystal scintillators or semiconductor crystals, such as GeLi or intrinsic germanium.

According to a second aspect of the invention we provide a method for monitoring radioactive emitting sources on an item/location, the method comprising monitoring beta and/or gamma emissions from the item/location, and subsequently monitoring alpha emissions if conditions are met. The alpha emissions monitoring comprising contacting the item with a medium, alpha emissions generating ions in the medium, moving the medium to a one or more electrodes for discharging ions provided in a detector chamber, the method further comprising monitoring ions discharged and/or collected on the electrode(s).

Preferably the beta and/or gamma emissions from the item or location are monitored before the alpha emissions are monitored. Preferably the alpha monitoring means are physically isolated from the item or location during the beta and/or gamma monitoring stage. The physical isolation may be effected by inhibiting the medium flow means and/or by providing a barrier between the item or location and the electrodes.

Preferably the item or location is first monitored for gamma emissions. The monitoring period may be relatively short, for instance between 1 second and 1000 seconds, such as 5 seconds and 300 seconds. Preferably an, at least approximate, determination is obtained relating to the gamma emission level. The determination, such as activity may be compared with a threshold value. A relationship between the alpha emission level and gamma emission level may be derived. Different subsequent procedures may be applied depending on whether the threshold is exceeded, i.e. high contamination, or whether it is not reached, i.e. low contamination.

If high gamma detection is monitored the item or location may be classified accordingly and/or treated or decontaminated accordingly and/or disposed of or stored accordingly and/or further monitored. The item or location may be further monitored using the gamma detection means. The gamma monitoring may be performed for a longer period of time than the first monitoring. A period of between 60 seconds and 6000 seconds may be employed, The function of the gamma emissions achieved through further monitoring may be processed to give an indication, qualitative or quantitative, of the total level of radioactive material present and/or the total level of contamination and/or the type of contamination present.

If low gamma detection is monitored the item may be classified accordingly and/or further treated accordingly and/or disposed of or stored accordingly, but preferably the item or location is further monitored for alpha emissions.

Alpha emission monitoring may be effected by removing the inhibition on their monitoring. Ions produced by the alpha emissions are preferably conveyed to the electrode(s) by the medium flow means, preferably following a control signal from the gamma and/or beta monitoring stage. The function of the alpha emissions achieved alone and/or in combination with the gamma and/or beta emission function may be used to determine the further action for the item or location. The further action may involve disposal and/or recycling and/or decontamination and/or reuse.

The second aspect of the invention includes the features, options and possibilities set out elsewhere in this application, including the steps necessary to implement them.

According to a third aspect of the invention we provide an instrument for monitoring one or more of alpha, beta and gamma emitting sources on an item. or location, the instrument comprising 4 detecting chamber enclosing the item or location to be monitored, and one or more of alpha monitoring means, beta monitoring means. gamma monitoring means.

The third aspect of the invention includes the features, options and possibilities set out elsewhere in this application, including the steps necessary to implement them, with particular emphasis on the manner in which the alpha monitoring and/or beta monitoring and/or gamma monitoring means are provided.

BRIEF DESCRIPTION OF THE DRAWINGS

Various embodiments of the invention will now be described, by way of example only, and with reference to the accompanying drawings, in which.

DETAILED DESCRIPTION OF THE PREFERRED EMBODIMENT

Items used in radioactive environments can potentially become contaminated with alpha and/or beta and/or gamma emitting sources. To monitor and potentially classify the level and type of contamination of an object it is therefore desirable to have as much information as possible. about the type and level of contamination present.

The environment to which an item has been exposed may effect the potential forms of emitter present and as a consequence not all emission types may be applicable to all items. A versatile system which can incorporate a variety of different emitter detectors in a modular manner and/or apply a variety of different emitter detectors in varying circumstances is, therefore, desirable.

Figure 1:
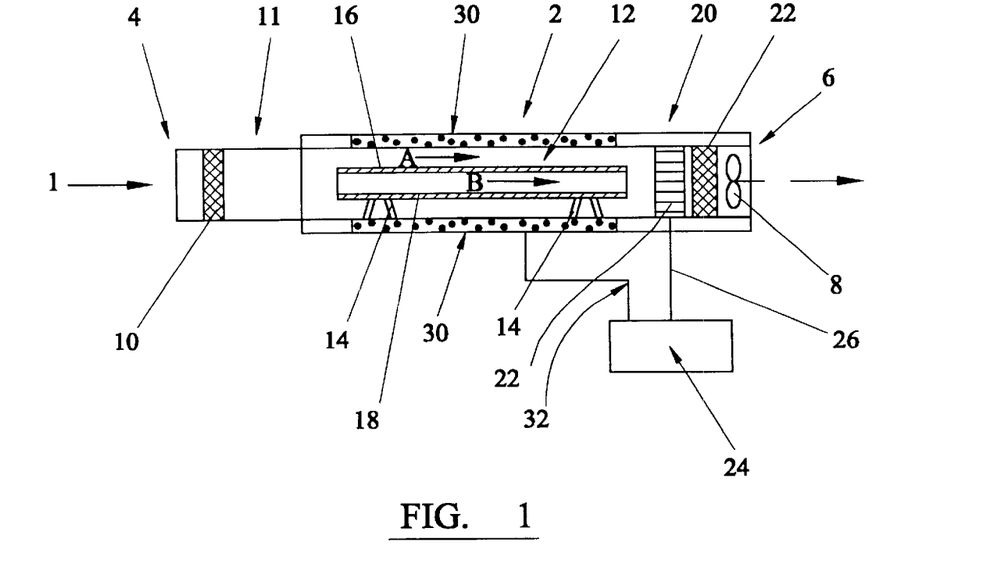
FIG. 1 illustrates an instrument according to a first embodiment of the invention.

FIG. 1 illustrates an instrument adapted to monitor both alpha and gamma emission through the emissions actually monitored, with, beta emission being indirectly obtained by calculation from the emissions actually monitored.

Detection of alpha particles emitted into air from an item are indirectly monitored as alpha particles travel only a few centimeters in air and as a consequence cannot be detected directly at detector locations distant from the source. During the course of their travel through the air, however, the alpha particles cause ionisation of a significant number of air molecules. These ionised molecules remain in that state for a sufficient period of time to be swept from in proximity with the item and to the detector before they re-combine. They provide a detectable ion current as a result.

In the embodiment first described, the apparatus provides an elongate measuring chamber 2 defining an inlet end 4 and an outlet-end 6. Air 1 is drawn through the measurement chamber 2 from the inlet 4 to the outlet 6 by means of a fan unit B.

At the inlet end 4 the measuring chamber 2 is provided with a filter 10, for instance a HEPA filter, through which all of the air passes. The air is filtered to remove suspended particulate matter and also to remove any existing ions in the air fed to the measuring chamber 2. The filter containing assembly 11 can be detached from the measuring chamber 2 to provide access to its interior.

Items to be monitored are inserted into the measuring chamber 2 and supported clear of the walls by a cradle 14. In this illustrated example, the item is a pipe 12, but other items such as beams plates or the like can be monitored in a similar way.

With the pipe 12 inserted the filter containing assembly 11 is re-positioned to close off the inlet end 4 of the measuring chamber 2. In this monitoring configuration the external surface 16 and internal surface 18 of the pipe 12 are generally aligned with the air flow through the apparatus.

Between the pipe 12 and the fan 8, the apparatus is provided with a detection unit 20. The fan 8 is also separated from the detection unit 20 by a further filter 22 intended to prevent particulate escape from the pipe 12 in the air flow.

In use, air is drawn by the fan 8 through filter 10 and past the pipe 12. The air flows both over the external surface 16, flow arrow A and also over the inner surface 18 of the pipe 12, flow arrow B.

Once clear of the end of the pipe 12 the air from over the external surface and from over the internal surface pass between detector plates 22 which form part of the detection unit 20.

Ions in the air generated by the alpha emissions are swept from their location of generation near the surfaces 16, 18 of the item and onto the detector unit 20.

Within the detection unit 21 an electrical field is generated between the array of plates 22. Charged particles, the ionised air molecules, entering this field are attracted to the plates 22 having an opposing applied potential. The ions are collected by the plates 22 as a result. The current resulting from these ions is detected by an electrometer in monitoring unit 24, via electrical connection 26.

The current arising can be equated to a given level of contamination using pre-obtained calibration data, A value for the overall contamination is thus obtained.

By blocking off the flow path over the external surface of the pipe a direct measurement of the internal surface contamination can be achieved. Similarly or alternatively blocking off the flow through the inner surface of the pipe can provide an indication of external contamination only.

The evaluation of the alpha contamination level obtained in the manner set out above can be supplemented with gamma emission monitoring using one or more gamma detectors positioned around the item 12.

In the embodiment illustrated in FIG. 1 a scintillation based gamma detector 30 is positioned below the chamber 2 and above it with another pair of detectors, not shown provided along the sides of the measuring chamber 2. Gamma rays emitted from the item 12 give rise to scintillation in these detectors 30 (plastic scintillator and photomultiplier) which is monitored and converted to an electrical output which is fed to monitoring unit 24 via connections 32. Gamma detection over a wide range of energies, 50 keV to at least 500 keV is employed. The gamma detectors are mounted on the outside of the inner skin of the measurement chamber 2, inside an outer skin. Background effects are reduced by shielding of the detectors in directions away from the measurement chamber 2.

once again a detection level based upon comparison of the output with calibration data gives a gamma contamination level. Gamma detectors of substantially corresponding length to the item to be monitored are employed in this embodiment.

Figure 2:
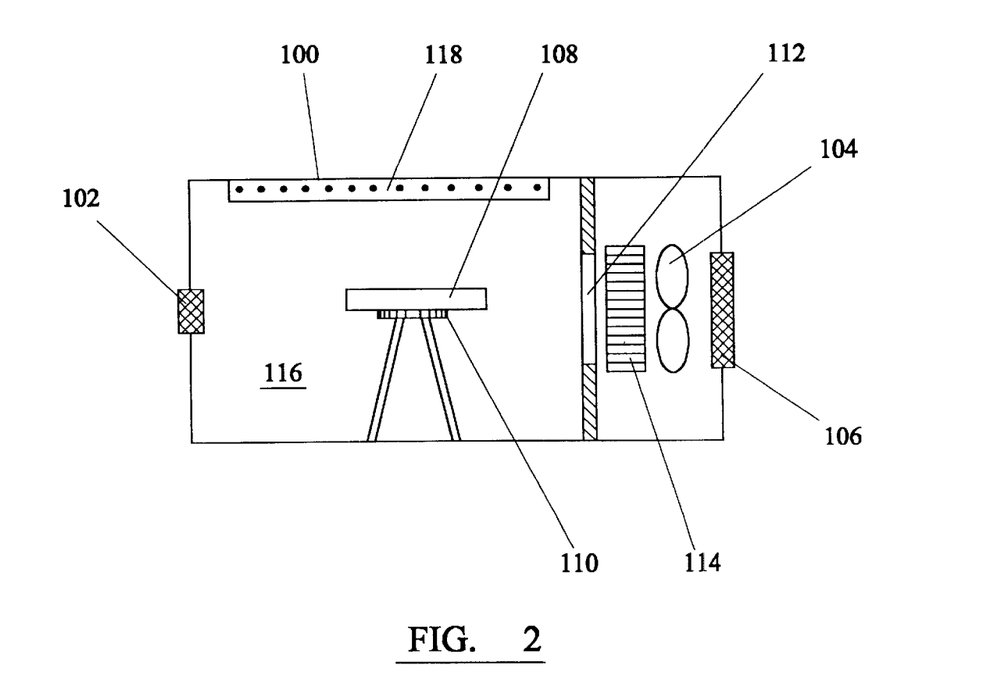
FIG. 2 illustrates an instrument according to a second embodiment of the invention.

In the embodiment of FIG. 2 a different instrument is employed to achieve alpha particle monitoring, for instance for smaller items.

The instrument consists of an enclosure 100 into which air car be draw through an aperture provided with a filter 102, by fan 104 which exhausts air through filtered outlet 106. In passing from the inlet to outlet the air passes over and around an item 108, for instance a spanner, placed on a grid type support 110. The apertures of the grid support 110 aid full surface contact for the air with the item 108. A vertical separation between the grid and supporting surface of at least 5 cm is preferred.

Having passed around the item 108 the air flows through a scalable aperture 112 and then on to detector unit 114 carrying any alpha particle generated ions with it. The ions are discharged/collected in the manner outlined above to give an indication of the alpha contamination. The sealable aperture 12 allows the alpha detection unit 114 to be isolated from the chamber 116 containing the item 108.

Gamma detection for the system can be provided by scintillators 118 mounted around the periphery of the unit. Additionally or alternatively direct beta detection can be provided by scintillators or proportional counters mounted around or within the unit.

As well as providing important alpha and/or gamma level detection information the apparatus can also be used to provide beta source monitoring. For many types of item the configuration of the item will render direct beta measurement (for instance using scintillators) inapplicable. Beta measurement would be shielded, for instance, by the walls of a pipe. However, for radionuclides typical in low level waste scenarios, beta emission fission and activation products are also typically gamma emitters. Whilst the gamma emissions may vary in energy and intensity between nuclides many of the common nuclides are readily detectable using conventional gamma counting methods of the. type outlined above. The gamma emissions monitored can subsequently form the basis of a beta determination.

Particularly in decommissioning working it is important that the items are graded or categorised as accurately as possible. The higher grade of waste an item is categorised as the greater the storage/disposal costs which apply to its decommissioning. In many cases unrestricted/free release of items may be possible, but it is important to check that this criteria is truly met before releasing the item. The present invention offers a technique and apparatus which can effectively demonstrate such a grading as appropriate for an item.

Unfortunately, if an item is placed in an instrument and alpha determination is carried out significant problems can occur if that item was of a relatively high contamination level, particularly if the contamination is loose.

If radioactive particles are drawn into the detection assembly of the instrument as airborne particles then that detector array will require cleaning before it can be re-used in a subsequent monitoring operation. This cleaning is required, not only to remove the contamination but also due to the significantly reduced detector sensitivity which occurs if radioactive particles are deposited in the detector assembly.

Figure 3:
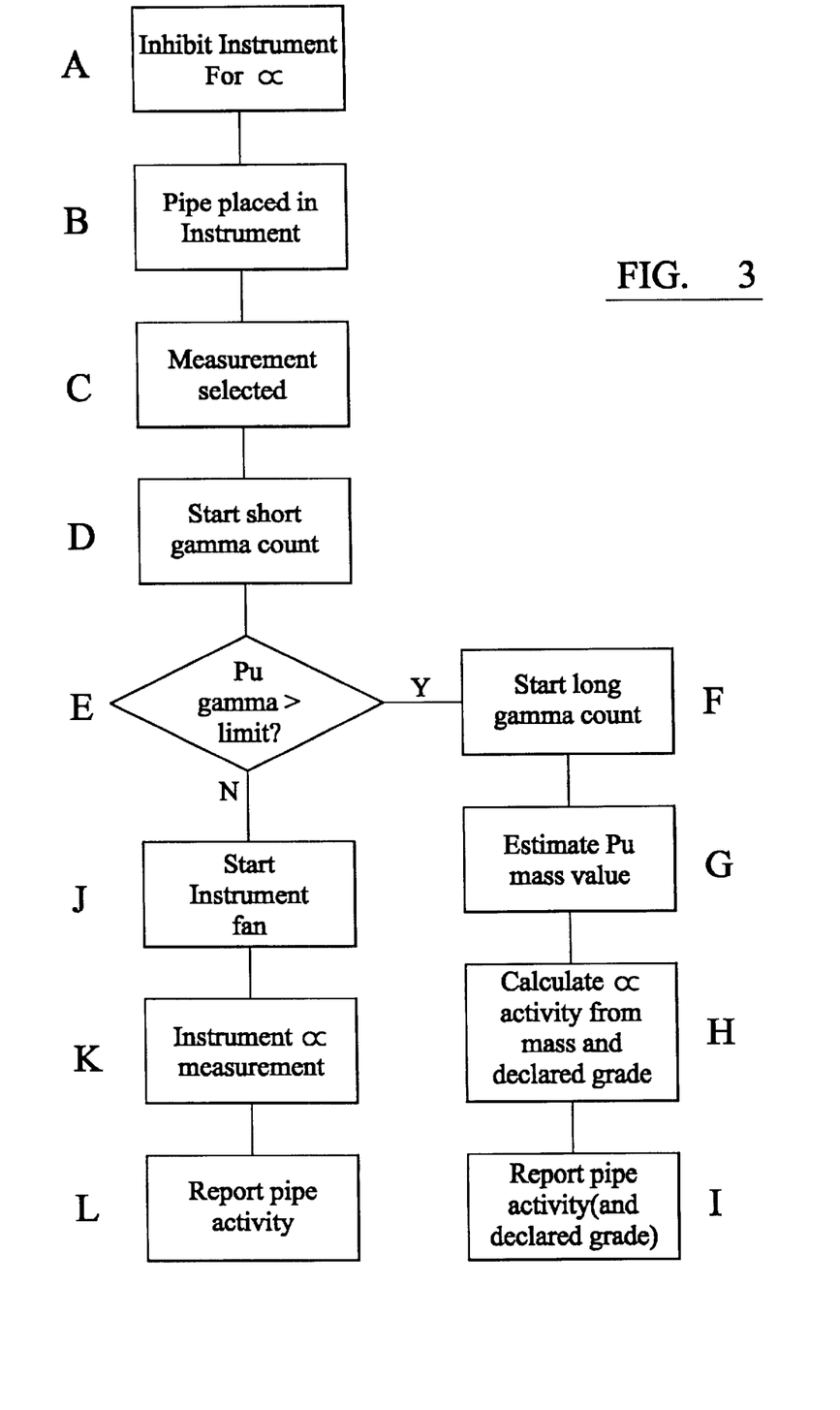
FIG. 3 illustrates a methodology for deploying instruments according to the present invention.

To counteract these problems it is proposed to use the type of instrument embodied above in a controlled methodology. The methodology is illustrated schematically in FIG. 3. The first stage, stage A, prior to the introduction of the item to be measured into the instrument, at stage B, involves inhibiting the fan. The type of measurement required is then selected, stage C.

if no significant level of contamination is envisaged, due to the operating environment in which the item was present, then the instrument can be used in an immediate combined alpha and gamma detection mode, not shown.

However, in the circumstances illustrated, with contamination likely, the alpha detection system is inhibited, and a short time duration gamma detection routine is carried out, stage D.

The gamma information determined in stage D is then used in evaluating, stage E, whether or not to proceed with an alpha determination or to employ further decontamination processing first. A screening technique is thus provided.

If significant gamma sources are present then proceeding with the alpha determination is not only unnecessary, but potentially problematical to the alpha detection system. As a consequence the method proceeds to undertake a long time duration gamma monitor of the item, stage F.

The results of stage F, are used to estimate the total gamma source content, for instance a plutonium content in the case of an item exposed to plutonium, stage G. Calculations are also employed to give the overall contamination, including alpha, stage H. The manner of the calculations can be tailored to the source types under consideration. Thus software options for plutonium, uranium and, other actinides, as well as fission products may be included.

Following the calculations a classification is applied to the item, stage It so determining whether the item is destined for further decontamination processing or consigned as plutonium containing material waste. Following further processing it is of course possible to return the item to the instrument for reevaluation, stage B.

If the gamma detection level is below acceptable levels then the alpha detection procedure can be employed, by starting the fan, stage J, so as to give an overall evaluation of alpha contamination, stage K, and gamma contamination. Based upon this a final classification of the item in terms of its waste category can be determined, stage L.

The gamma measurement also provides a variable confirmation that a true alpha measurement has been recorded and removes any possible concerns about measurements in particularly difficult measuring circumstances.

A beta detection system can be used in a similar manner to that described above for gamma emissions to provide a screening benefit. If the beta level is above a determined threshold the subsequent proposed alpha determination can be inhibited. If the beta level is below that threshold the alpha determination can be proceeded with.

The embodiments of the invention described above offer the flexibility of conducting alpha alone, gamma alone, alpha/gamma, gamma/beta and alpha/beta/gamma determinations for an item in a single analysis. Repeat handling and analysis to obtain separate readings for these factors is avoided as a result. Direct measurement (through the use of scintillators, for instance) or calculated measurement of beta emissions (from the known linkage between gamma emissions and beta emissions) is possible depending on the type of detectors deployed.

The system also offers a significant screening possibility, with minimal time requirement, so avoiding undesirable contamination of the alpha detecting apparatus.

The contents of the following patent applications filed on the equivalent date to this patent application are here incorporated by reference in their entirety, and with particular emphasis on the aspects and details listed below, these cases being improvements in and relating to monitoring ion sources, particularly as it relates to ion source location determination—our reference P17280; improvements in and relating to ion detection, particularly as it relates to increasing the number of ions generated—our reference P17284;

improvements in and relating to the collection of ions, particularly as it relates to the increased number of ions detected—our reference P17306; improvements in and relating to alpha and beta particle detection, particularly as it relates to the detector plat configurations—our reference P17301; improvements in and relating to ion monitoring, particularly as it relates to noise interference in the detection—our reference P17302; improvements in and relating to monitoring elongate items, particularly in relation to the technique for monitoring elongate items—our reference P17303; improvements in and relating to monitoring, particularly with respect to the details involved in increased accuracy of the readings—our reference P17304; improvements in and relating to detector plate mounting, particularly with regard to the details concerning the mounting of the detector plates—our reference P17305; improvements in and relating to current measurements, particularly as it relates to the manner of simplifying the current measurement—our reference P17307; and improvements in and relating to electrostatic monitoring, with particular emphasis on the electrostatic ion detection instrument—our reference P17300.

What is claimed is:

1. A method for monitoring radioactive emitting sources on an item/location, the method comprising:
   positioning an item/location comprised of a solid material within a detecting chamber of a housing, the item/location emitting alpha emissions and also emitting beta and/or gamma emissions;
   monitoring beta and/or gamma emissions from the item/location;
   comparing the monitored beta and/or gamma emissions to a predetermined threshold value; and
   subsequently monitoring alpha emissions from the item/location if the threshold value for beta and/or gammas emissions is not exceeded by the monitored beta and/or gamma emissions, the alpha emissions monitoring comprising contacting the item/location with a medium, alpha emissions generating ions in the medium, moving the medium to a one or more electrodes for discharging ions, the method further comprising monitoring ions discharged and/or collected on the electrode(s).

2. A method according to claim 1 in which the one or more electrodes used in the alpha monitoring are substantially isolated from the item/location during the beta and/or gamma monitoring.

3. A method according to claim 1 in which the item/location is first monitored for gamma emissions.

4. A method according to claim 3 in which as approximate determination is obtained relating to the gamma emission level, the determination is compared with a threshold value and different subsequent procedures are applied depending on whether the threshold value is exceeded or whether it is not reached.

5. A method according to claim 4 in which if the gamma detection exceeds the threshold value the item/location is further monitored for gamma emissions, the gamma monitoring being performed for a longer period of time than the first gamma monitoring.

6. A method according to claim 5 in which the function of the gamma emissions obtained through further monitoring is processed to give an indication of the total level of radioactive material present and/or the total level of contamination and/or the type of contamination present.

7. A method according to claim 4 in which if the gamma detection does not exceed the threshold value the item/ location is further monitored for alpha emissions, the function of the alpha emissions obtained alone and/or in combination with the gamma and/or in combination with the gamma and/or beta emission function being used to determine a further action for the item/location.

8. An instrument for monitoring alpha emitting sources and also beta and/or gamma emitting sources on an item or location, the instrument comprising:
   a detecting chamber adapted to enclose the item or location to be monitored;
   a beta monitor and/or a gamma monitor associated within the detecting chamber, the beta monitor and/or a gamma monitor being configured to monitor the beta and/or gamma emissions from the item or location when the item or location is disposed within the detecting chamber; and
   an alpha monitor configured to monitor the alpha emissions from the item or location when the item or location is disposed within the detecting chamber, the alpha monitor being substantially isolated from the item or location disposed within the detecting chamber such that the alpha monitor is not contaminated by the alpha emissions or ions generated therefrom during monitoring of the beta and/or gamma emissions.

9. An instrument according to claim 8 in which the alpha monitor is physically isolated from the item/location during beta and/or gamma monitoring stage by providing a barrier between the item/location and the alpha monitor.

10. An instrument according to claim 8 in which the item/location is in contact with a medium, means are provided for causing the flow of the medium passed the alpha monitor, the alpha monitor being physically isolated from the item/location during the beta and/or gamma monitoring stage by inhibiting the medium flow means.

11. A method for monitoring radioactive emitting sources, the method comprising:
    positioning an item/location within a detecting chamber bounded by a housing, the item/location being comprised of a solid material that emits alpha, beta, and/or gamma emissions;
    measuring the beta and/or gamma emissions emitting from the item/location within the detecting chamber;
    comparing the measured beta and/or gamma emissions to a predefined threshold value; and
    measuring the alpha emissions emitting from the item/location within the detecting chamber if the beta and/or gamma emissions do not exceed the predefined threshold value, the alpha emissions generating ions within a medium disposed within the detecting chamber.

12. The method as recited in claim 11, wherein the act of measuring the alpha emissions comprises:
    moving the medium to one or more electrodes disposed within housing so that the one or more electrodes discharge and/or collect the ions generated by the alpha emissions; and
    monitoring the ions discharged and/or collected on the one or more electrodes.

13. The method as recited in claim 12, wherein the ions generated within medium are maintained substantially isolated from the one or more electrodes during the act of measuring the beta and/or gamma emissions emitting from the item/location within the detecting chamber.

14. An instrument for monitoring radioactive emitting sources, the instrument comprising:
    a housing bounding a detecting chamber, the detecting chamber being adapted to selectively receive an item or location comprised of a solid material that emits alpha, beta, and/or gamma emissions, the alpha emissions generating ions within the detecting chamber when the item or location is disposed within the detecting chamber;

a beta detector or gamma detector associated with the housing so as to detect the beta or gamma emissions from the item or location when the item or location is disposed within the detecting chamber; and an alpha detection system associated with the housing, the alpha detection system comprising:

an electrode disposed within the housing so as to be substantially isolated from the ions generated within the detecting chamber;

means for moving the ions generated by the alpha emission within the detecting chamber to the electrode so that the electrode collects and/or discharges the ions; and means for monitoring the ions discharged and/or collected on the electrode.

15. An according to claim 14 wherein the beta detector is mounted within the detecting chamber.

16. An instrument according to claim 14 wherein the gamma detector is mounted on the outside of the detecting chamber.

17. An instrument according to claim 14 in which the means for monitoring ions discharged and/or collected on the electrode comprise electrostatic charge monitor.

18. An instrument according to claim 14 in which the means for monitoring ions discharged and/or collected on the electrode comprise current measurer.

* * * * *

UNITED STATES PATENT AND TRADEMARK OFFICE
CERTIFICATE OF CORRECTION

PATENT NO. : 6,353,230 B1
DATED : March 5, 2002
INVENTOR(S) : Christopher Henry Orr et al.

It is certified that error appears in the above-identified patent and that said Letters Patent is hereby corrected as shown below:

Column 1,
Line 31, after "detection" delete the peroid
Line 57, change "Additional" to -- additional --

Column 2,
Line 7, after "proximity" delete "to"
Line 61, before "airflow." change "is" to -- as --

Column 3,
Line 2, before "spacing" change "the" to -- The --
Line 53, change "form on" to -- from --

Column 4,
Line 15, before "one" delete "a"
Line 29, after "Preferably" change "an," to -- a, --
Line 44, change "employed," to -- employed. --

Column 5,
Line 3, change "item." to -- item --
Line 4, change "4" to -- a --
Line 6, change "means." to -- means, --
Line 33, change "possible." to -- possible --
Line 60, change "B" to -- 8 --

Column 6,
Line 4, after "beams" insert -- , --
Line 6, after "inserted" insert -- , --
Line 60, change "once" to -- Once --

Column 7,
Line 11, change "scalable" to -- sealable --
Line 15, change "12" to -- 112 --
Line 32, change "the." to -- the --
Lines 36 and 37, change "categorised" to -- categorized --
Line 37, after "as" insert -- , --

UNITED STATES PATENT AND TRADEMARK OFFICE
CERTIFICATE OF CORRECTION

PATENT NO.   : 6,353,230 B1
DATED        : March 5, 2002
INVENTOR(S)  : Christopher Henry Orr et al.

It is certified that error appears in the above-identified patent and that said Letters Patent is hereby corrected as shown below:

Column 8,
Line 14, after "F" delete ","
Line 24, change "It" to -- I, --

Column 9,
Line 35, change "gammas" to -- gamma --

Column 12,
Line 3, before "according" insert -- instrument --

Signed and Sealed this

Thirteenth Day of May, 2003

JAMES E. ROGAN
*Director of the United States Patent and Trademark Office*